Dec. 16, 1958     R. L. TRIPLETT     2,865,002
LONG SCALE INSTRUMENT
Filed May 7, 1954     2 Sheets-Sheet 1
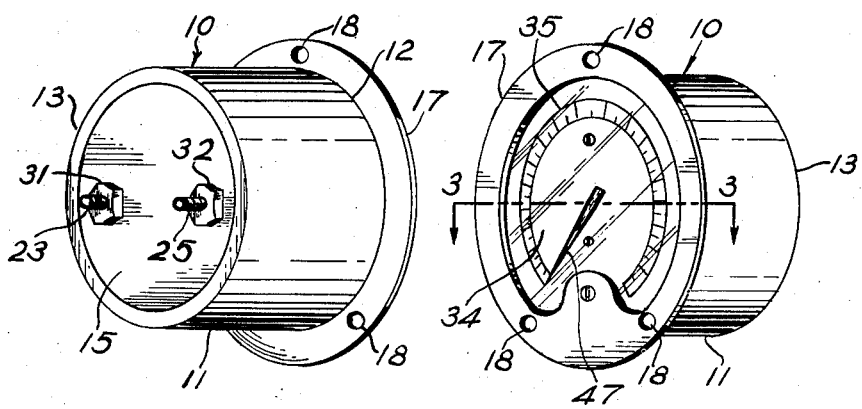
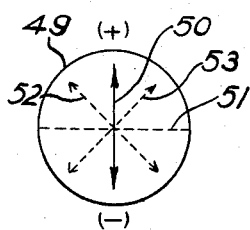
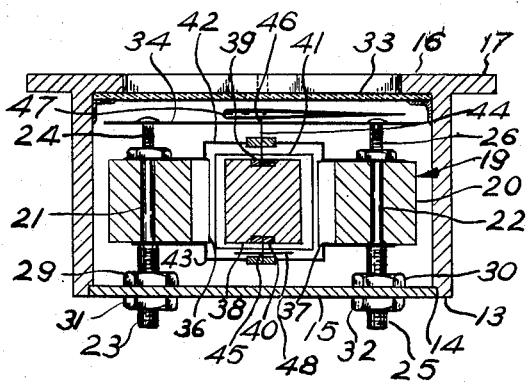
INVENTOR.
RAY L. TRIPLETT
BY Toulmin & Toulmin
ATTORNEYS Dec. 16, 1958     R. L. TRIPLETT     2,865,002
LONG SCALE INSTRUMENT
Filed May 7, 1954     2 Sheets-Sheet 2
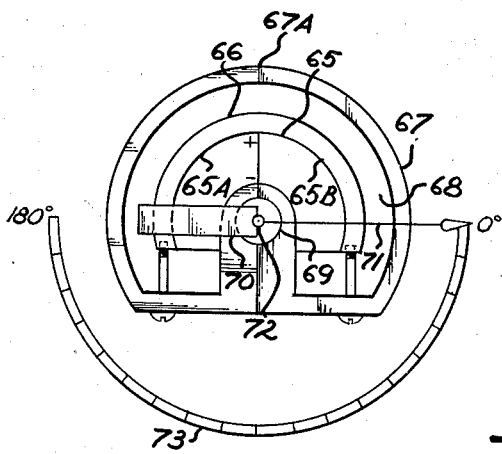
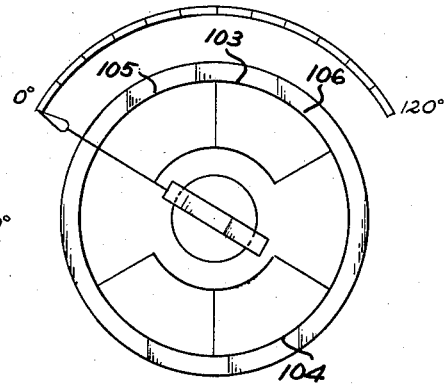
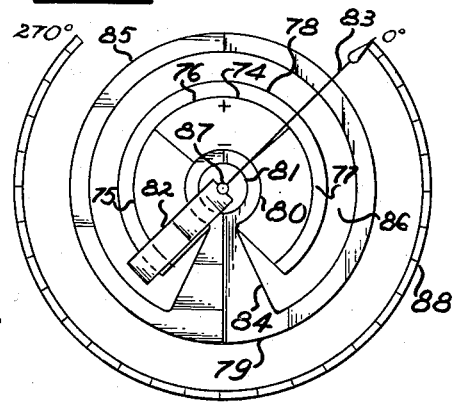
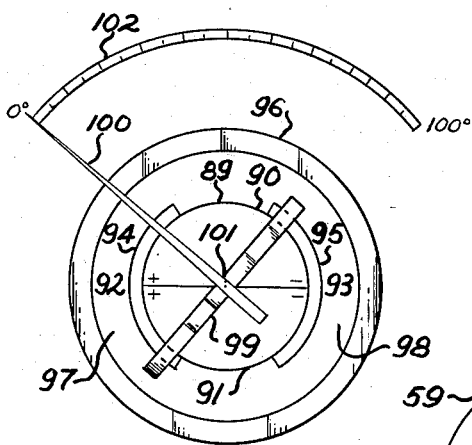
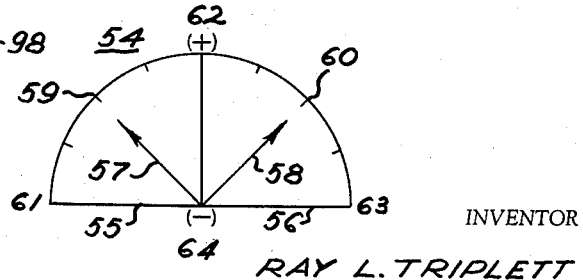
INVENTOR
RAY L. TRIPLETT
BY Toulmin & Toulmin
ATTORNEYS

United States Patent Office 2,865,002
Patented Dec. 16, 1958

2,865,002
LONG SCALE INSTRUMENT

Ray L. Triplett, Bluffton, Ohio, assignor to The Triplett Electrical Instrument Company, Bluffton, Ohio, a corporation of Ohio Application May 7, 1954, Serial No. 428,192

4 Claims. (Cl. 324—150)

This invention relates to long scale electrical measuring instruments of the permanent magnet type, more particularly to the structure of a permanent magnet wherein sections of directional magnetic steel are employed to extend the flux distribution beyond the normal angle of distribution, thereby obtaining an accurate measuring instrument having a long scale and good linearity.

In the field of electrical measurements, considerable use is made of instruments of the D'Arsonval type. An instrument employing the D'Arsonval principle essentially comprises a movable coil which is mounted to rotate in a uniform magnetic field set up by a permanent magnet. A pointer is attached to the movable coil, and this pointer in moving over a suitable scale will give an indication of the electrical measurements for which the instrument is being employed. The long-scale measuring instrument disclosed as this invention employs the D'Arsonval principle for direct current measurements.

As brought out above, the movable coil rotates within a uniform magnetic field. In order that readings obtained from this instrument may be accurate, it is necessary that this magnetic field be constant throughout the entire range of movement of the coil. This means that a uniform flux distribution must be set up in the magnetic gap.

The conventional oriented permanent magnet is of the internal type and is mounted inside the movable coil of electrical measuring instruments of this type and is either cylindrical or annular in form. When one of these conventional permanent magnets is magnetized along one of its diameters, a fairly uniform flux distribution is obtained only within an angle of approximately 45 degrees on either side of the magnetized diametrical axis. This uniform flux distribution limits a uniform scale to an angle of about 90 degrees. This means that a scale of 90 degrees or less must be employed in order to obtain linear readings thereon.

However, when the flux distribution is extended beyond this 90 degree angle a considerable change in linearity takes place. This change in linearity increases as the angle of flux distribution increases beyond 90 degrees.

This invention discloses an electrical measuring instrument wherein the uniform flux distribution is extended beyond a 90 degree angle. As the flux distribution is uniform, linear readings may be obtained throughout the entire angle of flux distribution. This means that long, uniform scales may be used in electrical measuring instruments. As the conventional directional permanent magnet permits a scale of 90 degrees to be used, it is to be understood that the term "long-scale" refers to an angle of greater than 90 degrees which defines the approximate limit for orienting such magnet steel.

The external magnets referred to herein are used outside the movable coil, and have the same directional characteristics as to polarity of magnetization as the internal magnet. Such magnets are usually annular in shape and fitted with soft iron pole pieces, as are also the internal magnets, to distribute the magnetic flux more uniformly throughout the assembled sections. A soft iron core inside the coil is used with external magnets.

In the magnetic unit disclosed in this invention each unit is comprised of a plurality of sections of directional steel. Each section subtends an angle of substantially 90 degrees or less. Each of these sections is magnetized along its central radial axis which corresponds to the direction of polarity oriented in the steel. In assembling the magnetic unit, two or more of these directional sections are joined together and then magnetized in the general direction of the directions of orientation of the individual sections. By attaching soft iron pole faces to the polar surfaces of the magnetic unit, a more uniform flux distribution will be obtained throughout the entire angle subtended by the assembled sections. Thus it is possible to construct electrical measuring instruments having uniform scales longer than is possible with a single section of a magnet of the same type.

A directional steel is one which has much better magnetic properties in one preferred axis. Such a steel is called "anisotropic." These magnetic properties are obtained by any one of several manufacturing processes. In one process the magnet is cooled from a normalizing temperature to black at a controlled rate in a strong magnetic field. The field is of the same configuration as that desired in the finished magnet.

There is no need for any special magnetizing apparatus when constructing electrical measuring instruments in accordance with this invention. Each section of the magnetic unit is directionalized in a strong magnetic field. Consequently, as no special magnetizing apparatus is required, it is possible to obtain an inexpensive long-scale electrical measuring instrument.

It is therefore the principal object of this invention to provide an improved magnetic unit for a long-scale electrical measuring instrument.

It is another object of this invention to provide a magnetic unit comprised of sections of directional magnetic material for a long-scale electrical measuring instrument.

It is a further object of this invention to provide an annular magnetic unit having a uniform flux distribution over an angle greater than 90 degrees.

It is a still further object of this invention to provide an annular magnetic unit of greater than 90 degrees which is magnetized through the use of conventional magnetizing apparatus.

It is still another object of this invention to provide an electrical measuring instrument having a linear scale over an angle greater than 90 degrees.

Other objects and advantages of this invention will become apparent upon reference to the accompanying description when taken in conjunction with the following drawings, wherein:

Figure 1 is a perspective view of the front face of an electrical measuring instrument constructed in accordance with this invention;

Figure 2 is a perspective view of the rear side of the electrical measuring instrument illustrated in Figure 1;

Figure 3 is a sectional view taken along the lines 3—3 of Figure 1;

Figure 4 is a schematic diagram of a conventional internal magnet made of directional steel showing the lines of flux extending diametrically through the magnet;

Figure 5 is a schematic diagram of an internal magnet comprising two sections;

Figure 6 is a schematic diagram indicating external magnet construction in accordance with this invention, whereby linear readings may be obtained over a scale of about 120 degrees;

Figure 7 is a schematic diagram of a single gap internal magnet structure comprising two sections in accordance with this invention whereby linear readings may be obtained over a scale of about 180 degrees;

Figure 8 is a schematic diagram of a single gap internal permanent magnet comprising three sections whereby linear readings may be obtained over a scale of about 270 degrees; and Figure 9 is a schematic diagram of a double gap internal permanent magnet comprising two semi-cylindrical sections whereby linear readings may be obtained over a scale of about 100°.

Returning now to the drawings, more particularly to Figure 1, wherein like reference characters indicate like parts throughout the various views, 10 indicates generally an electrical measuring instrument constructed in accordance with this invention. The electrical instrument 10 comprises a casing 11, which is cylindrical in form, and has a front end 12 and a rear end 13. Both the front and rear ends 12 and 13 respectively are open. The casing may be of metal or any other suitable material.

There is a shoulder 14 at the rear end 13 of the casing 11. A rear cover plate 15 is inserted into the shoulder 14, and retained in position by the use of suitable means.

At the front end 12 of the casing 11, there is an internal flange 16 and an external flange 17. A plurality of holes 18 are spaced in the external flange 17. The holes 18 are used for mounting the instrument.

The movement of the instrument is indicated generally at 19, and is supported upon the rear cover plate 15. The movement essentially comprises a permanent magnet 20. The permanent magnet 20 is mounted upon a pair of supporting posts 21 and 22. The supporting post 21 has one end threaded at 23, and the other end, 24, is also threaded but the threads 24 are of a smaller diameter than the threads 23. The supporting post 22 is likewise threaded at 25 and 26 respectively. The threaded ends 23 and 25 are inserted through apertures 27 and 28 respectively (not shown) in the rear cover plate 15. A pair of nuts 29 and 30 are placed upon threaded ends 23 and 25 respectively on the inner side of the rear cover plate 15. A second pair of nuts 31 and 32 are threaded upon the threaded ends 23 and 25 respectively on the outer side of rear cover plate 15. By tightening the outer nuts 31 and 32 against the rear cover plate 15, it can be seen that the supporting posts are held rigidly in position against the rear cover plate 15.

At the front end 12 of the casing 11 there is a cover glass plate 33 which is secured against the inner surface of the internal flange 16.

Positioned immediately beneath the glass cover plate 33 is a dial 34. The dial 34 is suitably fastened to the small threaded ends 24 and 26 of the supporting posts 21 and 22. A suitable linear scale 35 is inscribed on the dial 34. The various linear scales which are used in this invention will be described in detail later.

Returning to the structure of the permanent magnet 20, it is pointed out that the permanent magnet 20 may be either annular or cylindrical in form. An annular permanent magnet may be used as either an internal or external magnet. A cylindrical magnet finds its greatest use as an internal magnet. For purposes of illustration, the permanent magnet 20 illustrated in Figure 3 is of the external type.

On the inner surface of the external magnet 20 there are mounted pole pieces 36 and 37. The pole pieces 36 and 37 are formed of a suitable magnetic material which is relatively permeable. Such materials may be various alloys of nickel and iron or cold rolled steel.

Supported between the pole pieces 36 and 37 is a core member 38. The core member 38 is essentially cylindrical in form, and may be made of soft iron. Core supporting brackets indicated at 39 and 40 support core member 38 in the desired position.

A wire coil 41 is positioned to pivot around core member 38. The wire coil 41 is pivotally supported from front and rear coil supporting brackets 42 and 43 respectively. The coil supporting brackets 42 and 43 are suitably attached to the permanent magnet 20. The coil 41 is supported from the coil supporting brackets 42 and 43 by front and rear coil shafts 44 and 45 which are respectively journaled in the coil supporting brackets 42 and 43. The front coil shaft extends through an opening 46 in the dial 34 so that the free end of the front coil shaft 44 protrudes above the surface of the dial. A pointer 47 is secured on the free end of front coil shaft 44.

A biasing spring 48 which is in the form of a coil has one end thereof secured to the rear coil shaft 45 and the other end secured to the lower supporting bracket 43.

With the above construction of the electrical instrument 10 in mind, the construction of the permanent magnet 20 as disclosed in this invention will next be discussed in detail.

In Figure 4 there is represented a conventional internal magnet 49 of directional steel which has been magnetized in a magnetic field in the direction of the pointed arrow 50. "Directional" refers to a magnetic material which has been polarized along a single line or direction. Consequently, the positive and negative poles would be as shown and due to the directional qualities of the steel the polarities are permanently established. Therefore, as the magnetic lines of flux pass through the internal magnet 49 in the direction of pointed arrow 50, the lines of flux will be substantially vertical as they pass through the center of the internal magnet 49. As the magnetic lines of force approach the zero line of no polarity, indicated at 51, they will gradually diminish in strength. When they reach the zero line 51, the magnetic lines of flux are very weak. It is known, however, that for an angle of 90 degrees, such as indicated between the lines 52 and 53, the distribution of the magnetic lines of flux will be fairly uniform. In addition, they can be made more so by securing a soft iron pole face to the polar portions of the internal magnet 49. However, once the magnetic lines of force go beyond the lines 52 and 53 they diminish rapidly in strength until they reach the zero line of no polarity. Consequently, if an indicating scale of 90 degrees is used, it can be seen that linear readings will be obtained on this scale since there is a uniform distribution of lines of flux for an angle of 90 degrees. However, if the scale should be extended beyond the 90 degree angle, it can be seen that the readings on the scale will not be linear.

In order to use a scale upon which linear readings may be obtained, an internal magnet is constructed as shown in Figure 5.

In Figure 5, the internal magnet 54 is made up of sections 55 and 56. Each of the sections 55 and 56 is made up of directional steel which is charged or magnetized in the directions indicated by the arrows 57 and 58 respectively which are the central radial axes of the sections respectively. For each of these sections, the flux density will be the greatest at the points 59 and 60. The density will gradually diminish as the lines of magnetic force reach the ends 61 and 62 of section 55 and the ends 62 and 63 of section 56. Even though these lines of magnetic force do decrease, a fairly uniform field is still obtained between the points 61 and 62 of the section 55 and the points 62 and 63 of section 56.

By permanently joining the sections 55 and 56 along the line 62—64, there is obtained the internal magnet 54, which will give a uniform flux distribution through an angle of 180 degrees. The polarity of the internal magnet 54 is essentially negative along the horizontal line 61—63, and positive along the arc 61—62—63. In the situation where the magnet 54 is made into a cylinder the lower half would become negative and the upper half would remain positive.

Thus it can be seen that by the use of the internal magnet 54 an electrical measuring instrument can be obtained which will have a scale along which linear readings may be obtained through an angle greater than 90°.

Figures 7, 8, and 9 show internal magnets with soft iron pole pieces in position to complete the magnetic circuit.

This invention is not limited to internal magnets alone. In Figure 6 there is indicated the use of external permanent magnets constructed in accordance with this invention. In Figure 6 linear readings may be obtained along a scale extending through an angle of 120 degrees.

In Figure 6, two external permanent magnets 103 and 104 are used. As each of the magnets 103 and 104 is similar in construction, it will be necessary only to describe the construction of the magnet 103.

The external permanent magnet 103 is comprised of segments of an annulus 105 and 106. Each of the segments of an annulus 105 and 106 extends through an angle of 60 degrees. Each has been charged along its central radial axis generally as described in connection with Figure 5 pertaining to the sections 55 and 56. Consequently a uniform magnetic field distribution is obtained through an angle of 120 degrees and linear readings may be obtained on a scale extending through an angle of 120 degrees.

In Figure 7 there is illustrated a single gap internal permanent magnet 65 which is constructed similarly to the external magnets 103 and 104 depicted in Figure 6. In Figure 7 the permanent magnet 65 comprises sections 65A and 65B, each of which extends through an angle of 90 degrees. A soft iron pole piece 66 is secured around the peripheral surface of the magnet 65. A second pole piece 67 is in contact with the inner surface of the magnet 65 and extends around the pole piece 66 and is radially spaced therefrom to form a magnetic gap 68 therebetween. These pole pieces are of opposite polarity. The pole piece 67 has an opening 69 therethrough to accommodate a leg of the coil 70 attached to a pointer 71. The other leg of the coil is received within the magnetic gap 68. The pointer 71 is pivotally mounted at the point 72 and the pointer cooperates with a linear scale 73 which extends through an angle of substantially 180°. The pole piece 67 may be divisible along its vertical axis at 67A in order to permit access to the coil 70.

In Figure 8 there is illustrated a single gap internal permanent magnet 74 which is used to set up a uniform field of flux distribution through an angle of 270 degrees. The external magnet 74 comprises the sections 75, 76 and 77. Each of the sections 75, 76, and 77 extends through an angle of 90 degrees, and is charged along its central radial axis.

A soft iron pole piece 78 is secured around the peripheral face of the magnet 74. A second soft iron pole piece 79 has a circular core portion 80 which is closely received within the inner portion of the magnet 74. There is an opening 81 through the circular core portion 80 to accommodate a leg of a coil 82 which is secured to a pointer 83. The pole piece 79 has a connecting portion 84 which integrally connects the circular core portion 80 with a ring portion 85. The ring portion 85 surrounds the first pole piece 78 and is radially spaced therefrom to form a magnetic gap 86 therebetween. Another leg of the coil 82 is accommodated in the magnetic gap 86. In this embodiment all the pole pieces are of opposite polarities. The pointer 83 is pivotally mounted at 87 and cooperates with a linear scale 88 which extends through an angle of 270°.

The ring portion 85 has several functions. It serves to shield the movement of the instrument and also forms a return path for the lines of flux. The lines of flux extend substantially radially across the magnetic gap 86. As there is a uniform flux distribution through the magnetic gap 86, it can be seen that accurate linear readings may be obtained through an angle of substantially 270°.

In Figure 9 there is illustrated a double gap internal magnet 89 which comprises sections 90 and 91. These sections are joined together along the line 92—93. The polarities of each section are oriented along the common diameter 92—93 to establish the permanent polarities as indicated in Figure 9. There is a positive pole piece 94 made of soft iron and which extends to an angle of about 50° to both sides of the intersection 92—93. A negative pole piece 95 is similarly positioned. A soft iron ring 96 completely surrounds the magnet 89 and its associated pole pieces 94 and 95 and is spaced radially therefrom to form magnetic gaps 97 and 98. A coil 99 which is attached to a pointer 100 moves in the gaps 97 and 98. The pointer 100 is pivotally mounted at 101 and cooperates with a linear scale 102 which extends through an angle of about 100°.

It can be seen that by joining the positive poles of both sections with the pole piece 94 and the two negative poles of both sections with the pole piece 95, the effective pole piece of each polarity is extended beyond an angle of 90° and allows for a scale longer than 90°.

All the permanent magnets disclosed in this invention are made of a material having relatively high coercive force and maximum energy product. This material is magnetized and usually either cast or sintered. Satisfactory permanent magnets may be made of an alloy comprising iron, nickel, aluminum, and cobalt, of varying percentages.

The use of directional steel magnets is especially adapted for use in internal magnets. The use of the amount of metal in an internal magnet is necessarily limited because the diameter of the internal magnet must be less than the diameter of the coil within which the magnet is positioned. However, the magnetic leakage in an internal magnet is less than the magnetic leakage from an external magnet. The ratio of the leakages is of the order of 35 to 65 respectively. Less leakage results in less linear scale distortion. Consequently, since the amount of steel required is less together with the fact that the magnetic leakage is less, it can be seen that this invention readily adapts itself to widespread use in internal magnets.

Thus it can be seen that the present invention provides moving-coil electrical measuring instruments wherein the permanent magnets comprise a plurality of sections each of which is made from a directional steel. By charging each of the sections in a magnetic field it is not necessary that any special magnetizing apparatus be used when it is desired to have a permanent magnet extending through an angle of 180 to 270 degrees. This invention would also result in moving-coil instruments having greater accuracy than normally supplied in an instrument of this type. In addition, linear readings may be obtained from scales extending up to an angle of 360 degrees. While with proper pole piece construction the flux distribution surface may be 360 degrees, because of leakages in the magnetic path of distribution, the preferred distribution is usually limited to about 270 degrees.

It will be understood that this invention is susceptible to modifications in order to adapt it to different usages and conditions, and accordingly it is desired to comprehend such modifications within this invention as may fall within the scope of the appended claims.

What is claimed as this invention is:

1. In an electrical measuring instrument, a casing having a glass cover plate on one face thereof, a scale under said glass cover plate, a coil pivotally mounted within said casing and having a pointer movable over said scale, a core supported in said coil, a magnetic unit surrounding said coil, said magnetic unit comprising a plurality of segments of an annulus assembled end to end to form a unit which has a shape of a portion of an annulus greater than 90°, each of said segments subtending an angle of less than 90°, each of said segments comprising directional steel being directionalized only along an axis extending normal to the curvature of the segment midway between the ends thereof and being magnetized along said axis so that the distribution of magnetic flux is substantially equal at the ends of each segment as well as the central portion thereof whereby equal flux distribution is obtained along the arcuate length of the magnetic unit.

2. In an electrical measuring instrument, a casing having a glass cover plate on one face thereof, a scale under said glass cover plate, a coil pivotally mounted within said casing and having a pointer movable over said scale, a magnetic unit within said coil throughout the range of movement of said coil, said magnetic unit comprising a plurality of segments of an annulus assembled end to end to form a unit which has a shape of a portion of an annulus greater than 90°, each of said segments subtending an angle of less than 90°, each of said segments comprising directional steel being directionalized only along an axis extending normal to the curvature of the segment midway between the ends thereof and being magnetized along said axis so that the distribution of magnetic flux is substantially equal at the ends of each segment as well as the central portion thereof whereby equal flux distribution is obtained along the arcuate length of the magnetic unit.

3. In an electrical measuring instrument, a casing having a glass cover plate on one face thereof, a scale under said glass cover plate, a coil pivotally mounted within said casing and having a pointer movable over said scale, a magnetic unit within said coil, said magnetic unit comprising a plurality of segments of an annulus assembled end to end to form a unit which has a shape of a portion of an annulus greater than 90°, each of said segments subtending an angle of 90°, each of said segments comprising directional steel being directionalized only along an axis extending normal to the curvature of the segment midway between the ends thereof and being magnetized along said axis so that the distribution of magnetic flux is substantially equal at the ends of each segment as well as the central portion thereof whereby equal flux distribution is obtained along the arcuate length of the magnetic unit.

4. In an electrical measuring instrument having a casing with a glass cover plate on one face thereof, a scale under said glass cover plate, a coil pivotally mounted within said casing and having a pointer movable over said scale, a magnetic unit providing a flux gap in which a coil side moves, said magnetic unit comprising a plurality of segments of an annulus assembled end to end to form a unit which has a shape of a portion of an annulus greater than 90°, each of said segments subtending an angle of less than 90°, each of said segments comprising directional steel being directionalized only along an axis extending normal to the curvature of the segment midway between the ends thereof and being magnetized along said axis so that the distribution of magnetic flux is substantially equal at the ends of each segment as well as the central portion thereof whereby equal flux distribution is obtained along the arcuate length of the magnetic unit.

References Cited in the file of this patent

UNITED STATES PATENTS

| | | |
|---|---|---|
| 1,397,441 | Miller | Nov. 15, 1921 |
| 1,985,082 | Faus | Dec. 18, 1934 |
| 2,051,399 | Simpson | Aug. 18, 1936 |
| 2,394,113 | Seaver | Feb. 5, 1946 |
| 2,430,317 | Wilson | Nov. 4, 1947 |
| 2,515,014 | Lamb | July 11, 1950 |
| 2,524,297 | Quam | Oct. 3, 1950 |
| 2,683,921 | Goss | July 20, 1954 |
| 2,725,529 | Bernreuter | Nov. 29, 1955 |

FOREIGN PATENTS

| | | |
|---|---|---|
| 759,856 | Germany | Jan. 18, 1954 |